(12) United States Patent
Babb

(10) Patent No.: US 10,667,471 B1
(45) Date of Patent: Jun. 2, 2020

(54) AGRICULTURE PROTECTIVE COVER

(71) Applicant: Richard B. Babb, Beaufort, MO (US)

(72) Inventor: Richard B. Babb, Beaufort, MO (US)

( * ) Notice: Subject to any disclaimer, the term of this patent is extended or adjusted under 35 U.S.C. 154(b) by 304 days.

(21) Appl. No.: 15/886,540

(22) Filed: Feb. 1, 2018

Related U.S. Application Data

(60) Provisional application No. 62/453,689, filed on Feb. 2, 2017.

(51) Int. Cl.
*A01G 9/14* (2006.01)
*E04H 15/62* (2006.01)
*A01G 9/16* (2006.01)

(52) U.S. Cl.
CPC .............. *A01G 9/16* (2013.01); *A01G 9/1438* (2013.01)

(58) Field of Classification Search
CPC .......... A01G 9/16; A01G 9/1438; A01G 9/14; A01G 13/04; A01G 13/02; A01G 13/0206; A01G 13/0231; A01G 9/122; A01G 9/124; E04H 15/62
See application file for complete search history.

(56) References Cited

U.S. PATENT DOCUMENTS

| 3,480,023 | A | * | 11/1969 | McConnell | E04H 15/62 135/125 |
| 4,782,846 | A | * | 11/1988 | Ting | E04H 15/62 135/118 |
| 5,740,827 | A | * | 4/1998 | Swarringim | E04H 15/34 135/118 |
| 7,984,726 | B2 | * | 7/2011 | Lin | E04H 15/48 135/117 |
| 2010/0229905 | A1 | * | 9/2010 | Lin | E04H 15/48 135/96 |

* cited by examiner

Primary Examiner — Kristen C Hayes
(74) Attorney, Agent, or Firm — Grace J. Fishel

(57) ABSTRACT

An agriculture protective cover for plants that can be easily assembled and disassembled by a single person. The cover includes a plurality of spaced apart base pairs interconnected by arch tubes over which a protective sheet is strung. The bases have a receiver at one end mounted over a stake and an aperture on an opposite end configured for receipt of a spike. The receiver includes upwardly bendable tabs on which the arch tubes are mounted. The arches may be interconnected with stabilizing tubes.

14 Claims, 7 Drawing Sheets

US 10,667,471 B1

AGRICULTURE PROTECTIVE COVER

BACKGROUND OF THE INVENTION

Field of the Invention

The invention relates generally to plant shelters and protection for plants. These systems can be used to encourage the growth of plants by providing protection from various adverse conditions that can be detrimental to the plants.

Brief Description of the Prior Art

Conventionally plants have been provided protection by structures such as green houses and other types of framed enclosures. Oftentimes these structures are permanently located or are hard to relocate or reconfigure in size, coverage areas and usage. In addition many cannot be quickly erected or reconfigured to meet changing weather conditions, encroaching pests, diseases or other adverse plant conditions. Hence there is a need for an agriculture protective cover that may be easily and quickly erected and reconfigured.

BRIEF SUMMARY OF THE INVENTION

In view of the above, it is one object of the present invention to provide a user with a hooped shaped protective enclosures of various sizes, for various usages which can be quickly and easily erected or taken down by a single person. Another aspect of the invention is to provide an agriculture protective cover that can be used to protect plants from wind, frost, excessive sun, evaporative loss, certain diseases, insects, birds, various animals and persons whose access to the plants is not authorized. It can also be used inside an existing green house thereby providing a blanket of protective air between the plants inside the agriculture protective cover and the environment outside the existing green house.

BRIEF DESCRIPTION OF THE SEVERAL VIEWS OF THE DRAWINGS

In the accompanying drawings, in which several of various possible embodiments of the invention are illustrated, corresponding reference characters refer to corresponding parts throughout the several views of the drawings in which.

DETAILED DESCRIPTION OF AT LEAST ONE PREFERRED EMBODIMENT OF THE INVENTION

Figure 1:
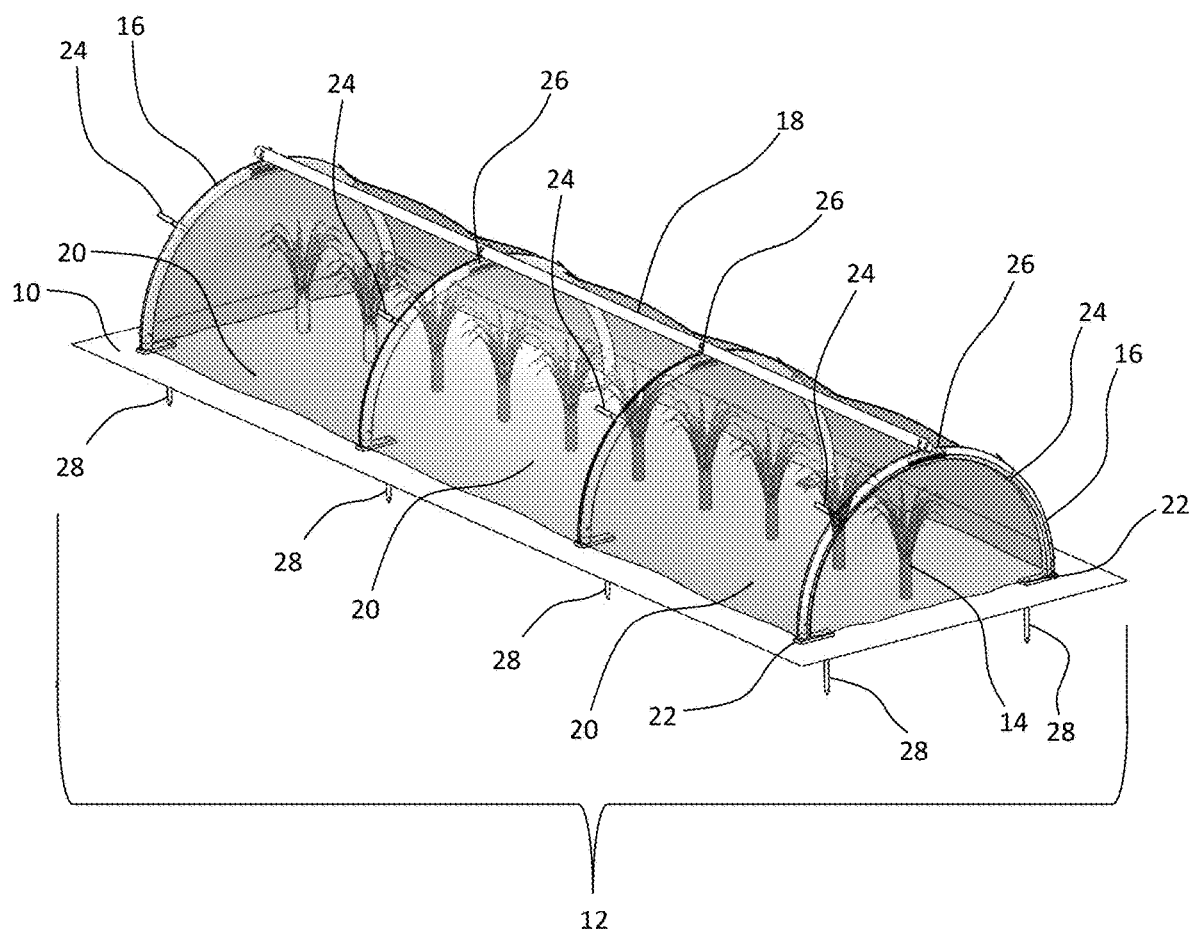
FIG. 1 is a perspective view an assembled agriculture protective cover in-use over a row of plants.

Referring to the drawings and more particularly by reference character, FIG. 1. is a view of an assembled agriculture protective cover 12 in-use on the ground over a row of plants. Shown is ground 10, plants 14, arch tubes 16, a straight stabilizing tube 18, a protective covering sheet 20, arch tube holding bases 22, sheet clamps 24, arch clamps 26 and a plurality of securing spikes 28.

Figure 2:
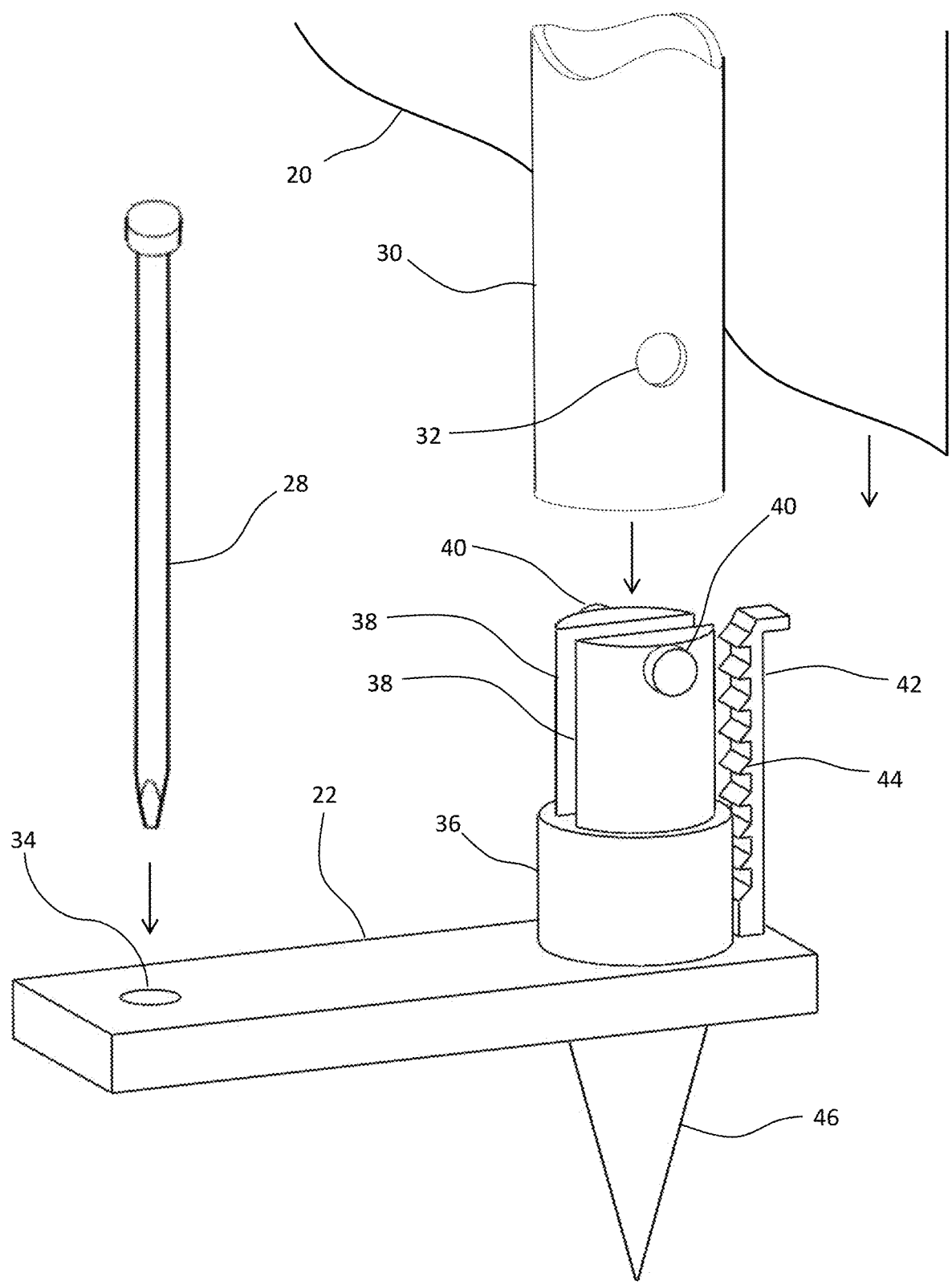
FIG. 2 is a perspective view of an arch tube holding base, the end of an arch tube, a protective covering sheet and a spike.

Now referring to FIG. 2 shown is a length of a straight section of tube 30, base 22 with an aperture 34, a receiver post 36, bendable tabs 38, locking pins 40, a protective covering sheet finger 42, gripping protrusions 44, a ground securing protrusion 46, spike 28 and transverse aligned holes 32.

Typically straight arch tubes 30 are pieces of 10 foot long PVC tubing but they may be of any length, shape or material so long as they are bendable into hoop shaped, arch tubes 16. In the preferred embodiment tubes 30 are standard one half inch or three quarter inch PVC pipe which is inexpensive and readily available. This tubing is also bendable so that it can be bent into the shape of arch tubes 16 as will be described but pre-bent material may also be used for arch tubes 16 without deviating from the intent of the invention. At each end of the straight arch tube 30 there are one or more transverse tube locking holes 32.

Also shown in FIG. 2 base 22 is formed as a flat elongated member with a receiver mounted on an upper side adjacent at a first end above stake 46 mounted on a lower side. Aperture 34 adjacent a second end of base 22 is configured for receipt of spike 28. Receiver includes post 36 upon which are mounted one or more bendable tabs 38 that are sized to fit within the straight stabilizer tubes 30. Protruding from bendable tabs 38 are one or more tube locking pins 40. Next to the receiver post 36 is finger 42 having a plurality of gripping protrusions 44. Located on the bottom of the base 22 is a pointed or otherwise stake-like ground securing protrusion 46. Also shown is spike 28 shown positioned over aperture 34. Although shown and described as a spike this could piece could be a tent peg, etc. and there may be one or more apertures 34 which may differ in size or shape to facilitate the used of different types of spikes. Also shown is a portion of protective covering sheet 20.

With continuing reference to FIG. 2 in the preferred embodiment stakes 46 under bases 22 are pressed into the ground 10 by hand or by foot to hold the bases in the desired position on the ground. Next securing spike 28 is placed through aperture 34 and driven into the ground 10 typically by foot or the use of a hammer so as to provide additional holding security of the base 22 in the desired position on ground 10.

Next straight section of tube 30 is installed over the bendable tabs 36 so that when the end of tube 30 abuts the top of receiver post 36 locking pins 40 engage the tube locking holes 32 and secure the tube in place on arch tube holding base 22. Although it should be noted that the tube receiver post 36 could be omitted without deviating from the intent of the invention.

As shown protective covering sheet gripping protrusions 44 located on protective covering sheet finger 42 are very close or even in touching proximity to receiver post 36 and straight arch tube 30 when the tube has been installed over bendable tabs 38. Therefore when protective covering sheet 20 is slid down between these features they serve as an interference clamp capable of holding the protective covering sheet 20 in place.

Figure 3A:
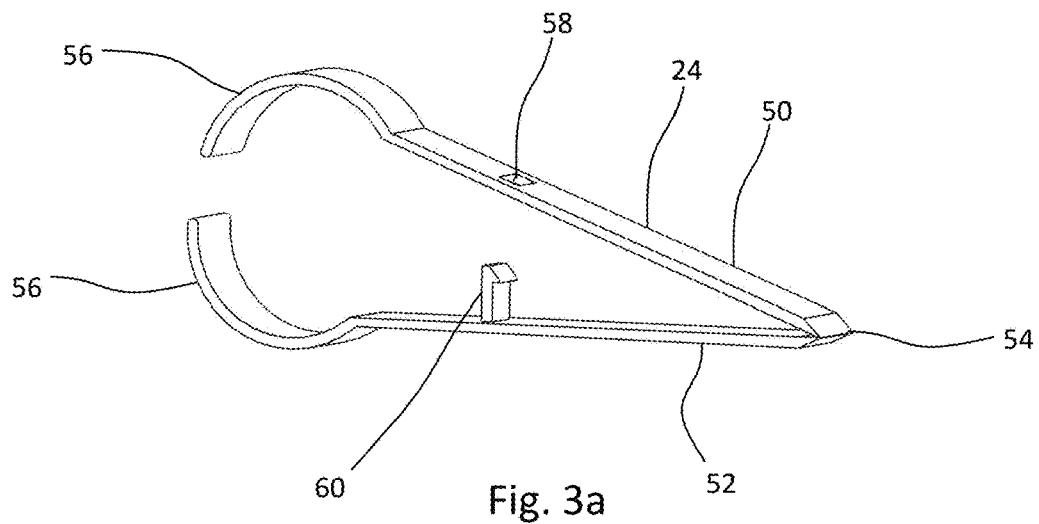
FIG. 3a is a perspective view of a protective covering sheet clamp in its open, unclamped position.

Referring now to FIG. 3a protective covering sheet clamp 24 is shown in its opened and unclamped position. This clamp has an upper curved finger 50, a lower curved finger 52, a clamp hinge point 54, receiver ends 56, a latching hole 58 and latching tab 60.

The upper clamp member 50 and a lower clamp member 52 are attached to each other at clamp hinge point 54 so that the upper and lower clamping members may be pushed towards each other or splayed apart. The upper and lower clamp members can be separate pieces that are connected together by any suitable hinging method such as a hinge hole and pin arrangement or they can be made as one piece and utilizes an easily bendable cross section area commonly referred to as a living hinge.

The ends of upper clamp member 50 and lower clamp member 52 opposite clamp hinge point 54 have receiver ends 56 which are shaped in such a way so that when they are drawn together they are able to grasp and capture protective covering sheet 20 covered arch tubes 16 or protective covering sheet 20 covered straight stabilizing tubes 18.

Figure 3B:
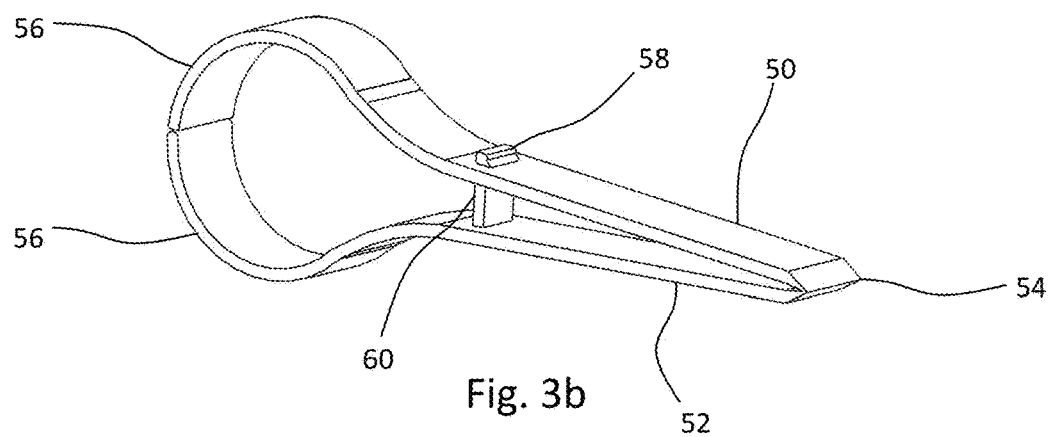
FIG. 3b is a perspective view of the protective covering sheet clamp in its closed, clamped position.

With continuing reference to FIG. 3a upper clamp member 50 and lower clamp member 52 employ one or more latching methods. As shown in this preferred embodiment; latch hole 58 in upper clamp member 50 opposes clamp latching tab 60 so that when the upper and lower clamp members are pushed towards each other latch finger 60 enters latch hole 58 so as to cause the upper and lower clamps to members to be secured close together as shown in FIG. 3b. While this embodiment depicts the protective covering sheet clamp 24 utilizing a latching tab and a matching latching hole it should be understood that any number of alternative latching, clamping and securing methods such as button snaps, Velcro, fold-over clasp etc. could be utilized to provide the latching feature.

Figure 3C:
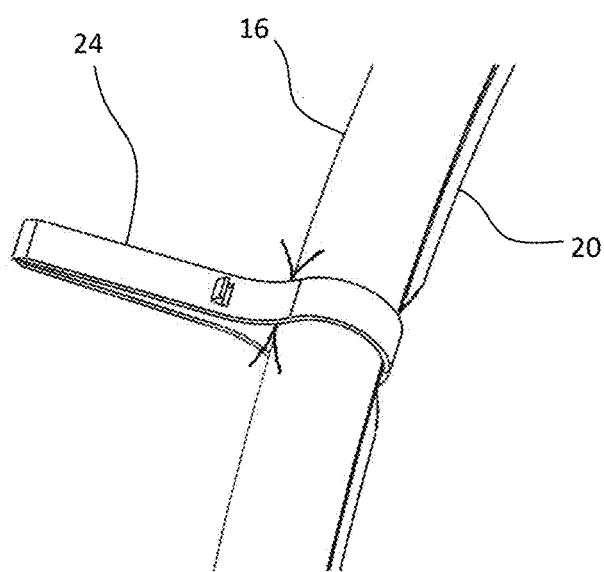
FIG. 3c is a perspective view of the protective covering sheet clamp clamped to an arch tube that is wrapped with a protective covering sheet.

FIG. 3c shows protective covering sheet clamp 24 installed over an arch tube 16 that has a piece of protective covering sheet 20 wrapped around it so as to hold the protective covering sheet 20 in place on arch tube 16.

Figure 4A:
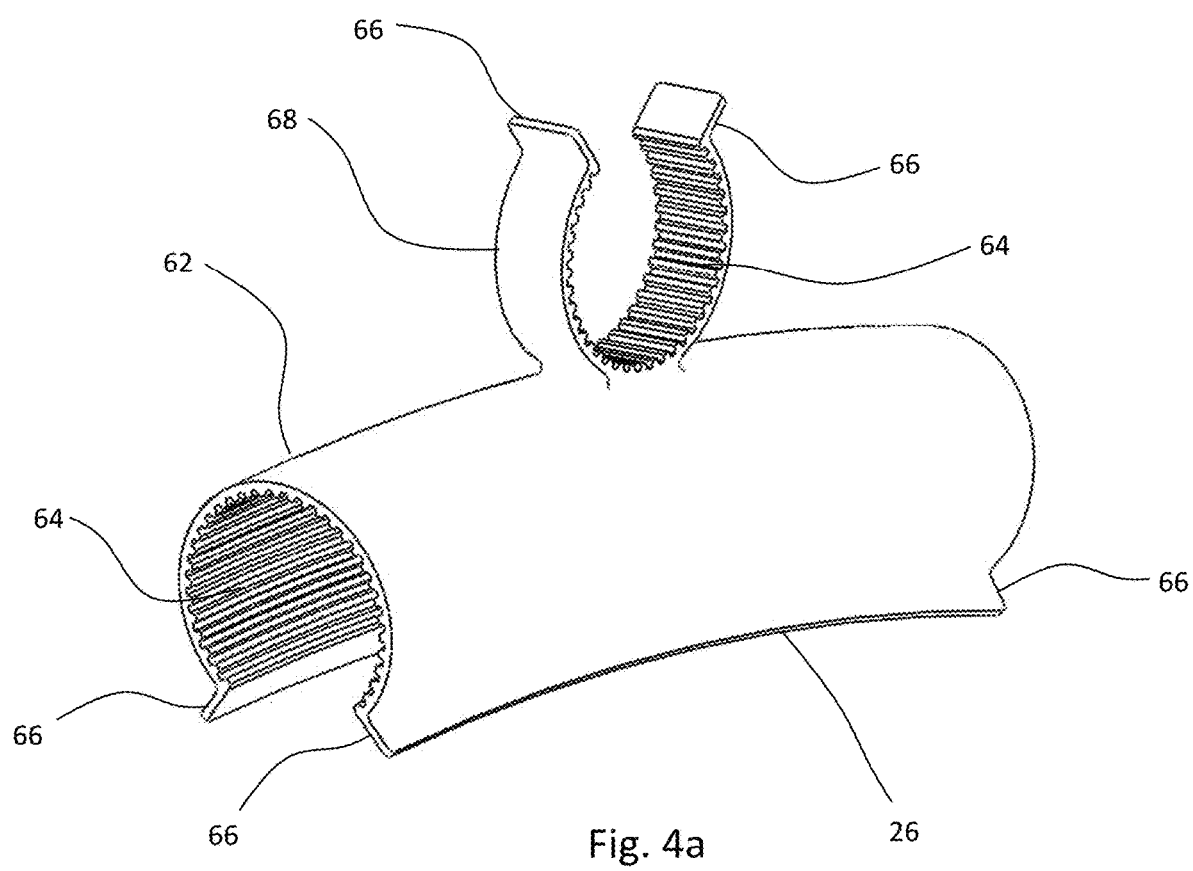
FIG. 4a is a perspective view of an arch clamp.

FIG. 4a shows arch clamp 26. This clamp consist of a relatively long curved compression clamp 62, clamp serrations 64 with spreading fingers 66 and a stabilizing tube clamp 68 transverse to clamp 62.

Arch clamp 26 features a relatively long, curved compression clamp 62 having a substantially C-shaped cross section or other profile suitable to facilitate spring loaded compression clamping onto curved arch tube 16. In this embodiment the inside of curved compression clamp 62 includes clamp serrations 64 which aid with the grasping of the arch tubes 16 or arch tubes 16 along with protective covering sheet 20 within the clamp. The curved compression clamp 62 opening also includes protruding clamp spreading fingers 66 that are sized and shaped to facilitate a spreadable or camming entry aperture which makes it easy for the user to push the semi-rounded compression clamp over and onto arch tube 16.

Also shown in FIG. 4a on top of arch clamp 62 is a relatively short stabilizing tube clamp 68 having a substantially C-shaped cross section or other profile suitable to facilitate spring loaded compression clamping on to a straight stabilizing tube 18 with or without a protective covering sheet 20. The inside of stabilizing tube compression clamp 68 include clamp serrations 64 which aid with the grasping of straight stabilizing tube 18 or of straight stabilizing tube 18 with or without a protective covering sheet 20. The stabilizing tube clamp 68 opening also includes clamp spreading fingers 66 that are sized and shaped to facilitate a spreadable entry aperture which makes it easy for the user to push the semi-rounded compression clamp over and onto straight stabilizing tube 18 with or without a protective covering sheet 20.

Figure 4B:
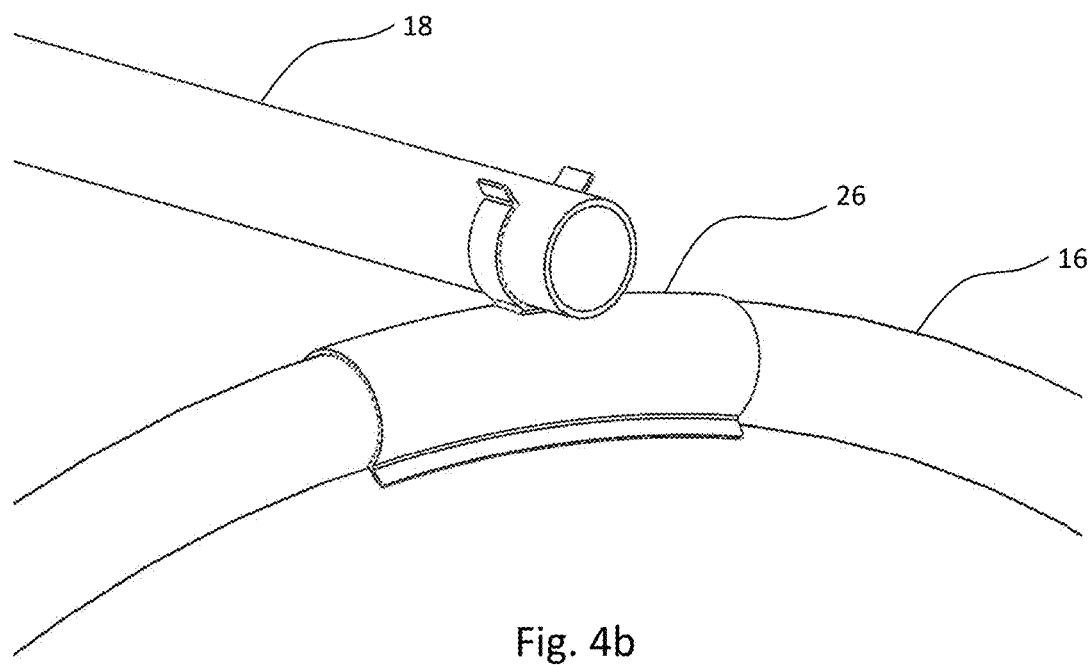
FIG. 4b is a perspective view of the arch clamp clamped on an arch tube with a straight stabilizing tube for interconnecting the arches to add additional stability to the structure.

FIG. 4b shows arch clamp 26 in-use, clamped to arch tube 16 and straight stabilizing tube 18 to add additional stability to the arch structure. Although it should be noted that more than one arch clamp 26 and straight stabilizing tube 18 can be used on the arch structure and in different positions other than at the top of the arch tube 16 as shown.

Figure 5:
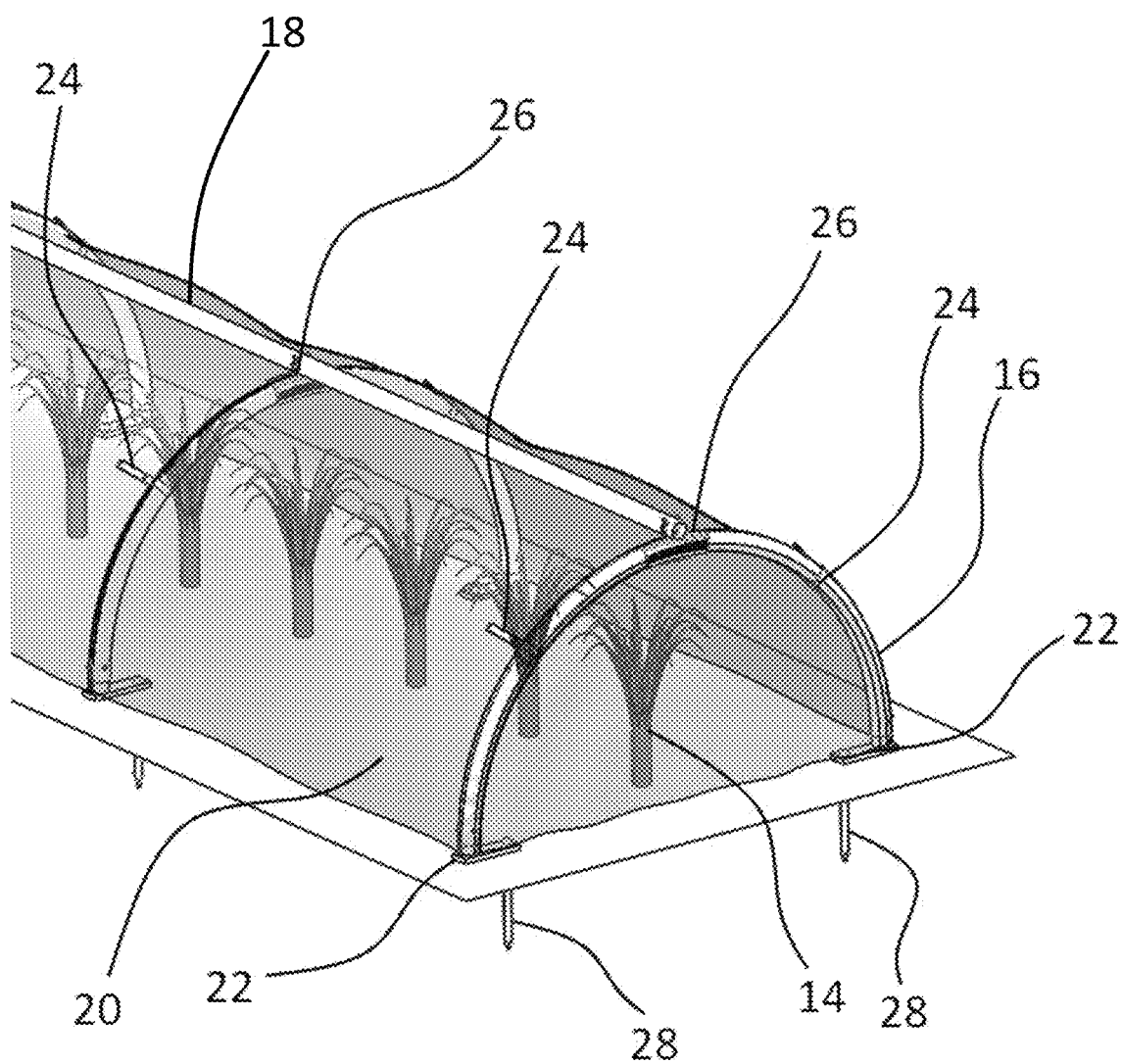
FIG. 5 is an enlarged perspective view of one end of an assembled agriculture protective cover in-use over a row of plants.

FIG. 5 is an enlarged view of one end of an assembled agriculture protective cover in-use on the ground over a row of plants. Shown is the ground 10, plants 14, arch tubes 16, straight stabilizing tube 18, protective covering sheet 20, receivers 22, protective covering sheet clamps 24, arch clamps 26 and plurality of spikes 28.

In the preferred embodiment the agriculture protective cover is assembled by first pressing a first line of bases 22 against the ground 10 by hand or by foot so ground securing protrusions 46 pierce the ground and hold the bases in the desired position. This line of bases 22 can be placed in the ground in a straight or curved line depending on the length and shape of agricultural protective cover desired. Next a securing spike 28 is placed into aperture 34 in base 22 and driven into the ground 10 typically by foot or by hammer so as to provide additional holding security of the bases 22 in the desired position on the ground 10.

Next a second row of bases 22 are placed and secured into the ground 10 in the same manner as the first row at similar intervals spaced according to the desired width and shape of the agricultural protective cover thereby forming a plurality of spaced apart base pairs.

At this point the user can place a straight section of tube 30 onto the first base 22 and lock it in place as described in FIG. 2. Next the upper end of this straight tube 30 is bent downwards and attached and locked into paired base 22 in the same manner so as to form arch tube 16. These arch tube 16 forming steps are then repeated so at to form the desired row of arches.

Next if additional arch structure stability is desired as described FIGS. 4a and 4b the user can attach arch clamps 26 onto the tops and/or the sides the arch tubes 16 using the arch clamp's curved arms 62. The remaining arch clamps 26 are placed on the other arch tubes 16 in the same manner and at similar intervals and positions required to hold one or more straight stabilizing tubes 18. The user can then place one or more straight stabilizing tubes 18 in tube clamps 68 as needed to achieve the desired arch tube structure stability.

After the arched tube structure is formed, the user can place one or more pieces of protective covering sheet 20 over the arch tube structure to achieve the protective cover desired. These sheets can be made of such materials such as plastic or fabrics. They can be made of insect netting, bird netting, provide Sun or UV protection, be transparent, semi-transparent or opaque, contain integrated insect or animal repellents, have properties that limit the entry or exit of air, rain and moisture etc.

Once the some or all of desired protective covering sheeting 20 is in place sheet clamps 24 such as shown FIGS.

3a and 3b can be used to provide additional attachments of the protective covering sheeting 20 to the arch tube structure. As shown in FIGS. 3a and 3b these clamps may utilize tab and hole snaps or be of any other attachment means suitable for attaching the protective covering to the tube framed structure.

Figure 6A:
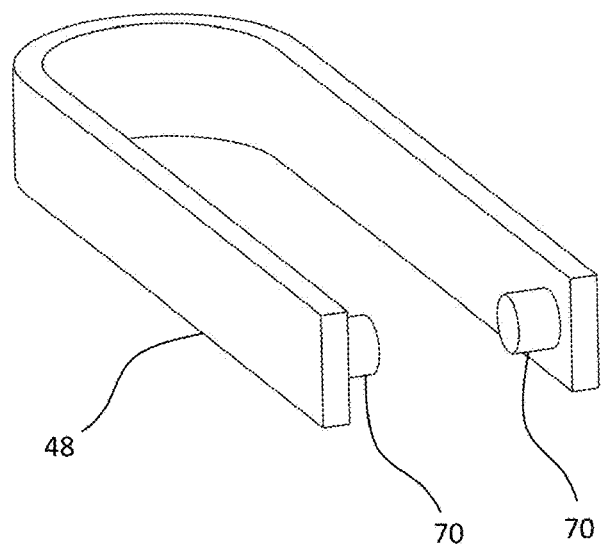
FIG. 6a is a perspective view of a release tool that can be used to disconnect the arch tubes from the bases and FIG. 6b is a perspective view of the release tool in use; and, FIG. 7 is a perspective view of a drill guide for making aligned transverse holes in the arch tubes.
Figure 6B:
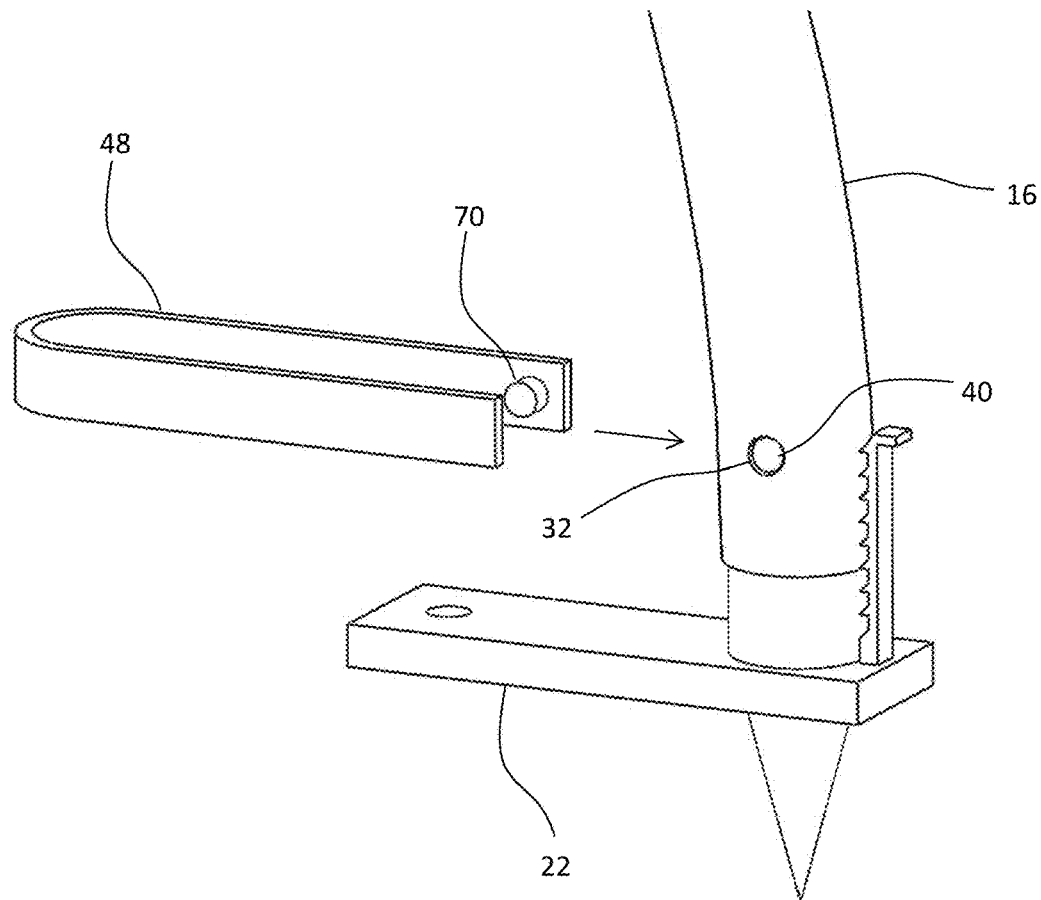

As previously described another advantage of the agriculture protective cover is the ability to disassemble, move or reconfigure it. In light of this, shown in FIG. 6a is a release tool 48 that can be used to disconnect the bases 22 from the arch tubes 16. This release tool has a squeezable u-shape or similar functioning body with release tool protrusions 70 that are sized and positioned to match up with the tube locking pins 40 located on bendable tabs 38. As shown in FIG. 6b when these release tool protrusions 70 are aligned with the tube locking pins 40 and the u-shaped release tool is squeezed release tool protrusions drive locking pins 40 inward so that they are pressed out of tube locking holes 32 and arch tube 16 can now be removed from the base 22.

Figure 7:
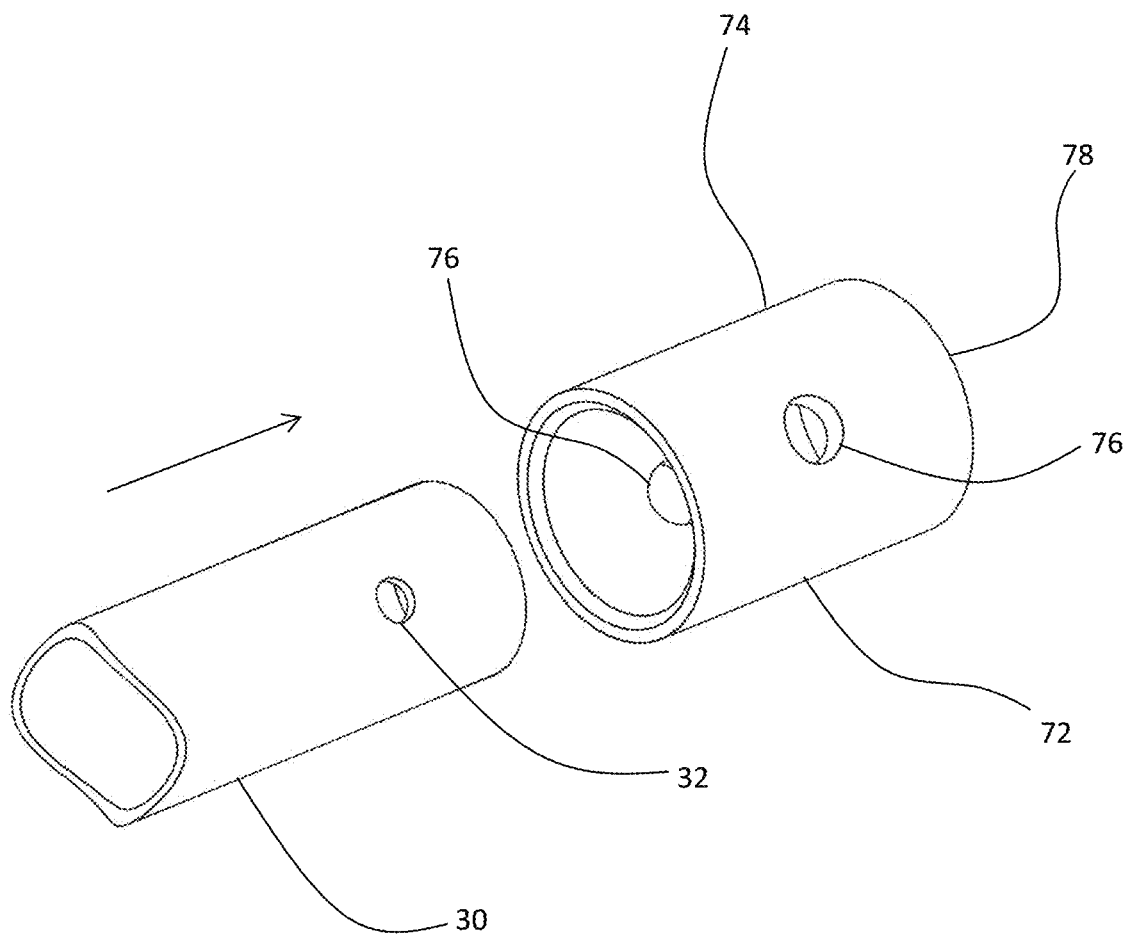

As shown in FIG. 7 another aspect of the invention is an arch tube locking hole drill guide 72. Shown is one end of straight arch tube 30, drill guide tubular body 74, drill guide holes 76 and a drill guide stop 78.

The arch tube locking hole drill guide 72 has a hollow drill guide body 74 preferably made of a hard material such as steel and is used to facilitate the correct placement of the arch tube locking holes 32 in straight arch tubes 30. It is used by placing straight arch tube 30 on the ground or another suitable surface. Next the user slides the arch tube locking hole drill guide 72 onto one end of the straight arch tube 30 until it presses up against drill guide drill stop 78 with one drill guide hole 76 facing straight up. The user then drills through the upward facing drill guide hole using a drill bit slightly smaller than that of drill guide hole 76 or a drill size specified in the provided agricultural protective cover assembly instructions and then continues to drill through to the other side of the straight arch tubes 30. Then being careful not to change the upwards position of the drilled hole by use of a clamp or by having another person place their foot on the straight arch tubes 30 to prevent it from rolling so that the previously drilled hole is still in the upwards position. The user then places the arch tube locking hole drill guide 72 on the other end of straight arch tubes 30 so that one drill guide hole 76 is also facing straight up. The user then drills though the straight arch tube 30 such that the transverse holdes adjacent opposite ends of arch tubes 30 are aligned.

As various changes could be made in the above constructions without departing from the scope of the invention, it is intended that all matter contained in the above description or shown in the accompanying drawings shall be interpreted as illustrative and not in a limiting sense.

What is claimed:

1. An agriculture protective cover comprising a plurality of spaced apart base pairs interconnected by arch tubes over which a protective sheet is strung,
    each of said bases being a flat elongated member with a receiver mounted on an upper side adjacent a first end above a stake mounted on a lower side, each of said bases further having an aperture adjacent a second end configured for receipt of a spike,
    said receiver having upwardly extending bendable tabs with one or more locking pins on which the arch tubes are mounted,
an upwardly extending finger mounted on the base adjacent the receiver configured for gripping a lower end of the protective sheet.

2. The agriculture protective cover of claim 1 wherein the arch tubes are formed of PVC pipe with aligned transverse holes adjacent opposite ends for latching receipt in the one or more locking pins on the bendable tabs.

3. The agriculture protective cover of claim 1 wherein the spaced apart base pairs and arch tubes are set in a row and the arch tubes are interconnected with one or more stabilizing tubes received in arch clamps mounted on the arch tubes.

4. The agriculture protective cover of claim 3 wherein the arch clamps are C-shaped in cross section and configured to facilitate spring loaded compression clamping on the arch tubes, each of said arch clamps having a tube clamp mounted on a back of the arch clamp, said tube clamp configured to facilitate spring loaded clamping on the one or more stabilizing tubes.

5. The agriculture protective cover of claim 3 wherein a plurality of sheet clamps are provided for clamping the sheet to the arch tubes, each of said sheet clamps having a pair of curved fingers spring biased apart and a latch for securing the curved fingers pinched together around the arch tubes with the protective sheet sandwiched between.

6. An agriculture protective cover comprising a plurality of spaced apart base pairs set in a row interconnected by arch tubes formed of PVC pipe with aligned transverse holes adjacent opposite ends over which a protective sheet is strung,
    each of said bases being a flat elongated member with a receiver mounted on an upper side adjacent a first end above a stake mounted on a lower side, each of said bases further having an aperture adjacent a second end configured for receipt of a spike,
    said receiver having upwardly extending bendable tabs over which an end of the arch tube is mounted with one or more locking pins received in one or more of the aligned holes in the arch tubes,
    an upwardly extending finger with a plurality of gripping protrusions mounted on the base adjacent the receiver configured for gripping a lower end of the protective sheet.

7. The agriculture protective cover of claim 6 wherein the arch tubes are interconnected with one or more stabilizing tubes received in arch clamps mounted on the arch tubes.

8. The agriculture protective cover of claim 7 wherein the arch clamps are C-shaped in cross section with outwardly directed camming ends configured to facilitate opening of the clamp when press fit over the arch tubes and spring loaded clamping on the arch tubes, each of said arch clamps having a tube clamp with outwardly directed camming ends mounted on a back of the arch clamp, said tube clamp configured to facilitate opening of the clamp and spring loaded clamping on the one or more stabilizing tubes.

9. The agriculture protective cover of claim 8 wherein a plurality of sheet clamps are provided for clamping the sheet to the arch tubes, each of said sheet clamps having a pair of curved fingers spring biased apart and a latch for securing the curved fingers pinched together around the arch tubes with the protective sheet sandwiched between.

10. An agriculture protective cover comprising a plurality of spaced apart base pairs set in a row interconnected by arch tubes formed of PVC pipe with aligned transverse holes adjacent opposite ends over which a protective sheet is strung,
    each of said bases being a flat elongated member with a receiver mounted on an upper side adjacent a first end above a stake mounted on a lower side, each of said bases further having an aperture adjacent a second end configured for receipt of a spike, said receiver having upwardly extending post on which bendable tabs are mounted and over which bendable tabs an end of the arch tube is mounted with one or more locking pins received in one or more of the aligned holes in the arch tubes, an upwardly extending finger with a plurality of gripping protrusions mounted on the base adjacent the receiver configured for gripping a lower end of the protective sheet between the post and the finger.

11. The agriculture protective cover of claim 10 wherein the arch tubes are interconnected with one or more stabilizing tubes received in arch clamps mounted on the arch tubes.

12. The agriculture protective cover of claim 11 wherein the arch clamps are C-shaped in cross section with outwardly directed camming ends configured to facilitate opening of the clamp when press fit over the arch tubes and spring loaded clamping on the arch tubes, each of said arch clamps having a tube clamp with outwardly directed camming ends mounted on a back of the arch clamp, said tube clamp configured to facilitate opening of the clamp and spring loaded clamping on the one or more stabilizing tubes.

13. The agriculture protective cover of claim 12 wherein a plurality of sheet clamps are provided for clamping the sheet to the arch tubes, each of said sheet clamps having a pair of curved fingers spring biased apart and a latch for securing the curved fingers pinched together around the arch tubes with the protective sheet sandwiched between.

14. The agriculture protective cover of claim 13 wherein the protective sheet is formed of netting.

\* \* \* \* \*